(12) United States Patent
Chung et al.

(10) Patent No.: US 8,411,648 B2
(45) Date of Patent: Apr. 2, 2013

(54) DOUBLE LINKED WIRELESS SENSOR NETWORK BEING CAPABLE OF BIDIRECTIONAL COMMUNICATION AND METHOD THEREOF

(75) Inventors: Tae-Yun Chung, Gangneung-si (KR); Han-Su Chung, Gangneung-si (KR); Jung-Ho Moon, Yongin-si (KR)

(73) Assignee: Gangneung-Wonju National University Industry Academy Cooperation Group (KR)

( * ) Notice: Subject to any disclaimer, the term of this patent is extended or adjusted under 35 U.S.C. 154(b) by 286 days.

(21) Appl. No.: 12/990,131

(22) PCT Filed: Feb. 11, 2009

(86) PCT No.: PCT/KR2009/000625
§ 371 (c)(1),
(2), (4) Date: Oct. 28, 2010

(87) PCT Pub. No.: WO2009/134005
PCT Pub. Date: Nov. 5, 2009

(65) Prior Publication Data
US 2011/0038252 A1  Feb. 17, 2011

(30) Foreign Application Priority Data

Apr. 29, 2008 (KR) .................. 10-2008-0039752

(51) Int. Cl.
*H04W 4/00* (2009.01)
(52) U.S. Cl. ........................... 370/337; 370/350
(58) Field of Classification Search ............... None
See application file for complete search history.

(56) References Cited

U.S. PATENT DOCUMENTS

| | | | | |
|---|---|---|---|---|
| 7,978,666 B2 * | 7/2011 | Keshavarzian et al. | ....... | 370/338 |
| 2003/0048765 A1 * | 3/2003 | Jang | ............... | 370/337 |

| | | | |
|---|---|---|---|
| 2007/0014268 A1 | 1/2007 | Kim et al. | |

(Continued)

FOREIGN PATENT DOCUMENTS

| KR | 10-2006-0011329 | 2/2006 |
|---|---|---|
| KR | 10-2008-0070966 | 8/2008 |

OTHER PUBLICATIONS

International Search Report-PCT/KR2009/000625 dated Sep. 21, 2009.

*Primary Examiner* — Min Jung
(74) *Attorney, Agent, or Firm* — Cantor Colburn LLP (57) ABSTRACT

Provided are a double linked wireless sensor network capable of performing bidirectional communication and a method of transmitting and receiving data. In each of nodes constituting the wireless sensor network, an active duration and an inactive duration are alternately repeated, and the active duration is configured to include an upstream duration, an intermission duration, and a downstream duration. Each of the downstream duration and the upstream duration is configured to sequentially include a second receive slot, a second receive processing slot, a first receive slot, a first receive processing slot, a transmit slot, a transmit processing slot, a first acknowledge slot, a first acknowledge processing slot, a second acknowledge slot, and a second acknowledge processing slot, and wherein bidirectional communication can be performed between the sink node and the terminal node in a single period of the active duration. In the wireless sensor network, a transmit processing duration TXP is maintained in a receiving mode capable of receiving data from other nodes, so that a new node can be easily joined as a terminal node or an intermediate node. In addition, in the wireless sensor network, each of the upstream duration and the downstream duration is provided with consecutive two receiving durations, so that, although links to consecutive two nodes are disconnected, it is possible to simply recover the links.

10 Claims, 11 Drawing Sheets

U.S. PATENT DOCUMENTS

| | | | |
|---|---|---|---|
| 2009/0201838 A1* | 8/2009 | Zhang et al. | 370/280 |
| 2009/0219875 A1* | 9/2009 | Kwak et al. | 370/329 |
| 2010/0020732 A1* | 1/2010 | Gaddam et al. | 370/310 |
| 2011/0002243 A1* | 1/2011 | Sherman et al. | 370/280 |

* cited by examiner

DOUBLE LINKED WIRELESS SENSOR NETWORK BEING CAPABLE OF BIDIRECTIONAL COMMUNICATION AND METHOD THEREOF

TECHNICAL FIELD

The present invention relates to a double linked wireless sensor network having a linear structure, and more particularly, to a wireless sensor network having a linear structure having an upstream duration and a downstream duration in a single period of an active duration and being capable of performing bidirectional communication in the single period and a data transmitting/receiving method in the wireless sensor network.

BACKGROUND ART

A sensor network is an important technical infrastructure for implementing ubiquitous computing technologies. The sensor network may be operated in wired or wireless connection. In the sensor network, since each node uses a battery having a limited energy capacity, it is most important to transmit sensing data by using minimum energy. In addition, in order to adapt the sensor network to a real-time application system, network latency in a large-scale network needs to be minimized. Therefore, in the sensor network requiring real-timing monitoring, a protocol capable of minimizing power consumption of the battery and having small network latency is needed.

Each of nodes constituting a wireless sensor network (WSN) performs operations such as sensing peripheral information, computing, and wireless communication by using limited battery energy. In the case where a typical MAC protocol such as existing MANET and IEEE 802.11 is adapted to the sensor network, problems such as packet collision/latency, overhearing, control packet overhead, and idle listening, which consume energy in the wireless network, occur. In particular, in the idle listening, since a sensor node always operates in an active state even in a duration where a communication function is not required, much energy consumption occurs. In order to complement the problems, a MAC (medium access control) protocol used in a sensor network reduces energy consumption by using a method of minimizing power consumption by operating in a sleep state at a normal time and periodically waking up and operating in an active state. As an example of a sensor MAC protocol using such a method, there are a Sensor-MAC, a Timeout-MAC, a B-MAC, and the like.

However, in the aforementioned sensor MAC protocols, energy efficiency is decreased. If a duty cycle is allowed to be decreased in order to increase the energy efficiency, the network latency occurs in proportion of the decrease of the duty cycle. In other words, the aforementioned sensor MAC protocols, the energy consumption and the network latency have an inversely proportional relationship therebetween. Therefore, the aforementioned sensor MAC protocols have problems in the case where a limit power source such as a battery is used and real-time application is required.

In order to solve the problems, Korean Patent No. 10-656385, titled "Communication Method in Real-time Wireless Sensor Network Having linear structure" discloses a communication protocol having a linear structure adapted to a wireless sensor network. Although the communication protocol disclosed in the Patent Document can configure an efficient wireless sensor network as a whole, the communication protocol has a problem in that downstream for transmitting data or commands from a sink node to a terminal node cannot be configured.

Figure 1:
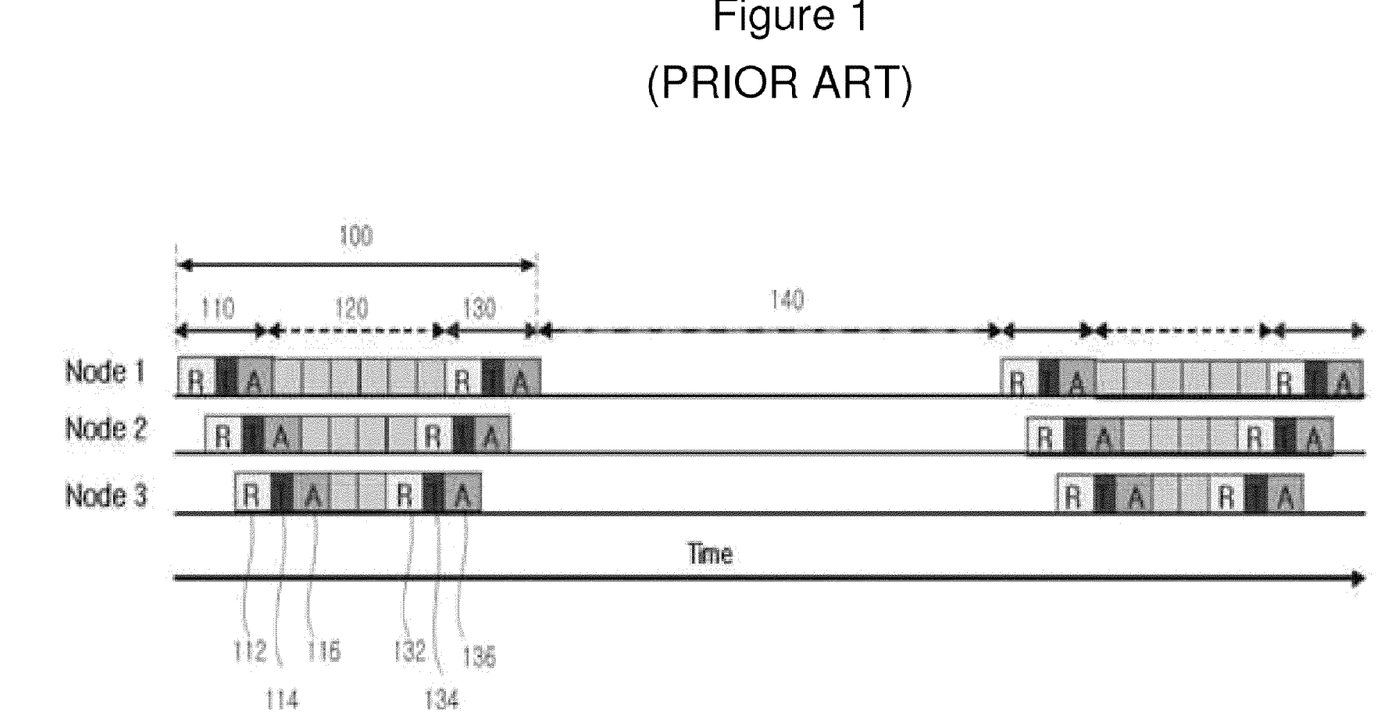
FIGS. 1 and 2 are conceptual diagrams illustrating data transmission/reception structures of a conventional wireless sensor network.
Figure 2:
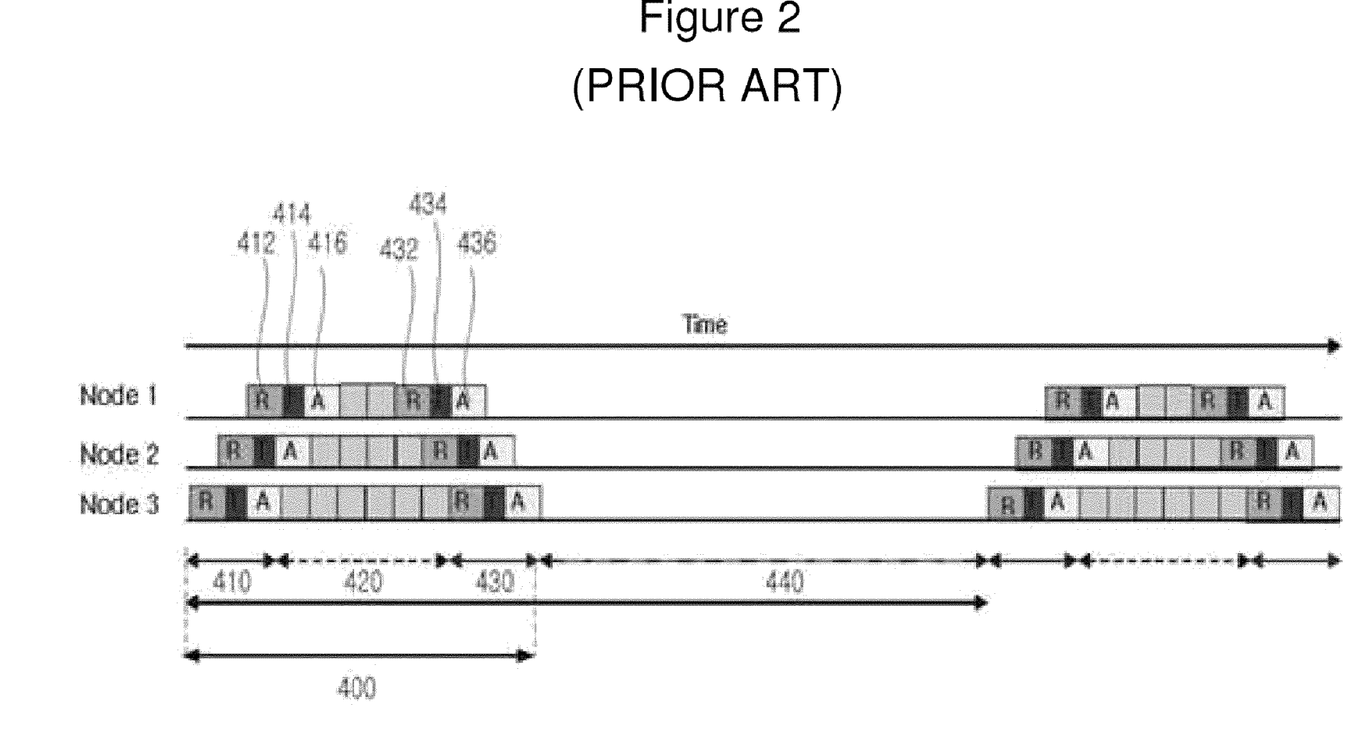

In order to solve the problem, the inventor of the present invention discloses a technology in Korean Patent Application 10-2007-0008935. FIGS. 1 and 2 are conceptual diagrams illustrating data transmission/reception structures of the wireless sensor networks disclosed in the aforementioned Patent Document. Specifically, FIG. 1 is a packet diagram illustrating example TDMA packets in a conventional sensor network of a linear structure. Referring to FIG. 1, an active period 100 and an inactive period 140 each having a predetermined time length are repeated in each node of the sensor network according to the present invention. The active period 100 includes a downstream duration 110, an intermission duration 120, and an upstream duration 130. Each of the downstream duration 110 and the upstream duration 130 sequentially includes a RX interval 112, 132, a TX interval 114, 134, and an ACK interval 116, 136, respectively. On the other hand, each data packet transmitted or received by each node preferably includes its own identification and link direction information. The link direction information indicates a propagation direction of a corresponding packet, e.g., any one of the downstream duration and the upstream duration. If the sensor network includes n nodes (i.e., the first node, the second node, . . . , the nth node), the first to nth nodes are linearly connected, the first node is also called a sink node, and the bottommost nth node is also called a terminal node. During the downstream duration 110 of the active period, the sink node transmits commands to the terminal node. During the upstream duration 130, the terminal node transmits data to the sink node in response to the command from the sink node. As shown in FIG. 1, the sensor network according to the present invention has both of the downstream duration for transmitting commands and the upstream duration for transmitting data from each node in a single period. Therefore, the sink node can transmit commands as well as receive processing results for the commands within a single period. FIG. 2 is a packet diagram illustrating other example TDMA packets in the conventional sensor network with the linear structure. Referring to FIG. 2, an active period 400 and an inactive period 440 each having a predetermined time length are repeated in each node of the conventional sensor network. The active period 400 includes an upstream duration 410, an intermission duration 420, and a downstream duration 430. Each of the upstream duration 410 and the downstream duration 430 sequentially includes a RX interval 412, 432, a TX interval 414, 434, and an ACK interval 416, 436. However, in the wireless sensor network disclosed in the Korean Patent Application, there is a problem in that, in the case where linkage between consecutive two nodes is broken, it is difficult to perform link recovery.

DISCLOSURE

Technical Problem

The present invention is to provide a sensor network having a linear structure capable of bidirectional communication, which can simply recover links although a link of one node or links of consecutive two nodes are disconnected, and a method of transmitting and receiving data.

The present invention is also to provide a sensor network having a linear structure capable of bidirectional communication, in which a new node can be simply joined as a terminal node or an intermediate node, and method of transmitting and receiving data.

Technical Solution

According to an aspect of the present invention, there is provided a wireless sensor network having a plurality of nodes, wherein each of the nodes has an active duration so as to transmit and receive data with respect to an upper node and a lower node, wherein the active duration is configured to include an upstream duration for transmitting data and commands from a terminal node to a sink node and a downstream duration for transmitting data and commands from a sink node to a terminal node, wherein each of the downstream duration and the upstream duration is configured to sequentially include a second receive slot RX2, a second receive processing slot RXP2, a first receive slot RX1, a first receive processing slot RXP1, a transmit slot TX, a transmit processing slot TXP, a first acknowledge slot ACK1, a first acknowledge processing slot ACKP1, a second acknowledge slot ACK2, and a second acknowledge processing slot ACKP2, and wherein bidirectional communication can be performed between the sink node and the terminal node in a single period of the active duration.

In the wireless sensor network according to the aforementioned aspect, it is preferable that wherein, in the wireless sensor network, transmission of data and commands are performed in a synchronized state of the downstream duration and the upstream duration, wherein, in a synchronized state of an upstream duration with respect to an arbitrary node, the RX1 and the ACK1 of the node are synchronized with the TX of the child node and the TX of the parent node, and the RX2 and the ACK2 of the node are synchronized with the TX of the grandchild node and the TX of the grandparent node, and wherein, in a synchronized state of a downstream duration with respect to an arbitrary node, the RX1 and the ACK1 of the node are synchronized with the TX of the parent node and the TX of the child node, and the RX2 and the ACK2 of the node are synchronized with the TX of the grandparent node and the TX of the grandchild node.

According to another aspect of the present invention, there is provided a method of transmitting and receiving data bidirectionally in a wireless sensor network having a plurality of nodes, including steps of: (a1) synchronizing an RX1 and an ACK1 of an upstream duration of a specific node with a TX of a child node and a TX of a parent node and synchronizing an RX2 and an ACK2 with a TX of a grandchild node and a TX of a grandparent node; and (a2) synchronizing an RX1 and an ACK1 of a downstream duration of the specific node with the TX of the parent node and the TX of the child node and synchronizing an RX2 and an ACK2 with the TX of the grandparent node and the TX of the grandchild node.

In the method of transmitting and receiving data bidirectionally in a wireless sensor network according to the aforementioned aspect, the method may further include steps of: in the case where an external new node is to join as a terminal node of the wireless sensor network, (b1) the new node searching for a terminal node by scanning the nodes of the network; (b2) the new node transmitting a join request message to the searched terminal node; (b3) the terminal node transmitting a join response command to the new node; and (b4) the new node being changed in a synchronized state according to the join response command from the terminal node and the new node becoming a terminal node in the next period, so that the new node is allowed to join as the terminal node of the network.

In the method of transmitting and receiving data bidirectionally in a wireless sensor network according to the aforementioned aspect, the method may further include steps of: in the case where an external new node is to join as an intermediate node of the wireless sensor network, (b1) the new node selecting a parent node by scanning the nodes of the network; (b2) the new node transmitting a join request message to the selected parent node during the ACKP1 of the upstream duration; (b3) in the case where the parent node receives the join request message from the new node during the TXP of the upstream duration, the parent node transmitting a backward shift command to a child node during the TX of the downstream duration; (b4) the child node shifting backwards by one time slot duration according to the backward shift command received from the parent node; (b5) the parent node transmitting a join response command to the new node during the TX of the upstream duration in the next period; (b6) the new node being changed in a synchronized state according to the join response command from the terminal node and the new node becoming a child node of the parent node, so that the new node is allowed to join as the intermediate node of the network.

In the method of transmitting and receiving data bidirectionally in a wireless sensor network according to the aforementioned aspect, the method may further include steps of: in the case where the link to the second node is disconnected in the sensor network where the first node, which is an upper node, the second node, and the third node are sequentially connected to each other, (c1) the third node transmitting a message to the first node and the second node during the TX of the upstream duration; and (c2) if the link of the second node is checked to be disconnected, the first node changing the third node into a child node of the first node, so that the network is recovered without a process of changing durations of other nodes.

In the method of transmitting and receiving data bidirectionally in a wireless sensor network according to the aforementioned aspect, the method may further include steps of: in the case where the links to the consecutive second and third nodes are disconnected in the sensor network where the first node, which is an upper node, the second node, the third node, the fourth node, and the fifth node are sequentially connected to each other, (d1) if the data transmission and reception with respect to the second and third nodes are checked not to be available, the fourth node transmitting a link recovery request message to the first node and, after that, generating a third receiving duration to be synchronized so as to receive data from the first node; (d2) if the link recovery request message is received from the fourth node, the first node checking the states of the links to the second and third nodes and, after that, transmitting a link recovery response command to the fourth node; (d3) if the link recovery response command is received from the first node, the fourth node transmitting a forward shift request command to the fifth node during the third receiving duration; and (d4) the fifth node shifting forwards by one time slot duration according to the forward shift request command from the fourth node, so that the network is received. In addition, it is preferable that the third receiving duration of the fourth node is generated to follow the second acknowledge processing duration ACKP2 and synchronized with the transmit duration TX of the first node.

Advantageous Effects

In a wireless sensor network according to the present invention, a transmit processing duration TXP is maintained in a receiving mode capable of receiving data from other nodes, so that a new node can be easily joined as a terminal node or an intermediate node.

In addition, in the wireless sensor network according to the present invention, each of the upstream duration and the downstream duration is provided with consecutive two receiving durations, so that, although links to consecutive two nodes are disconnected, it is possible to simply recover the links.

BEST MODE

Hereinafter, a sensor network having a linear structure and a communication method in the sensor network according to exemplary embodiments of the present invention are described in detail with reference to the attached drawings.

The terms used in the specification are defined as follows. A sink node is a node which allows a WSLP bidirectional network to be operated. A terminal node is a node having no child node. A middle node is a node having a parent node and a child node. A parent node, a grandparent node, a child node, and a grandchild node denote an upper node, a next upper node, a lower node, and a next lower node, respectively. Joining denotes that a node is allowed to join as one node of a WSLP network. A depth of a node denotes the number of access operations required for reaching from a sink node to the node. Downstream command and data are command and data transmitted from a sink node to a terminal node. Upstream command and data are command and data transmitted from a terminal node to a sink node.

Figure 3:
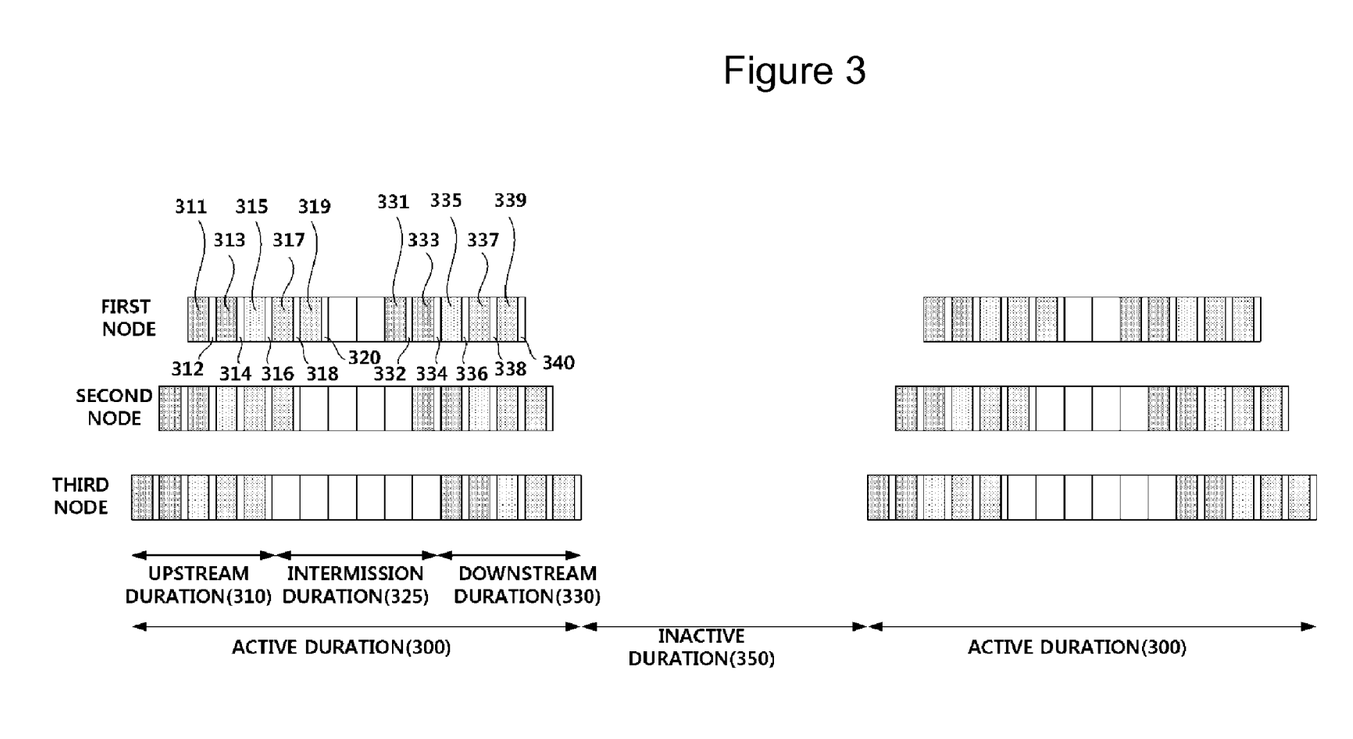
FIG. 3 is a conceptual diagram illustrating the entire TDMA structure of a sensor network having a linear structure being capable of performing bidirectional communication according to an embodiment of the present invention.

FIG. 3 is a conceptual diagram illustrating the entire TDMA structure of a sensor network having a linear structure being capable of performing bidirectional communication according to an embodiment of the present invention. Referring to FIG. 3, in each node of the sensor network according to the embodiment of the present invention, active durations 300 and inactive durations 350 repeat with a predetermined time interval. The active duration is a duration where data or commands are received and transmitted between nodes. The active duration is configured to include an upstream duration 310, an intermission duration 325, and a downstream duration 330. Each of the upstream duration and the downstream duration is configured to sequentially include a second receive slot (hereinafter, referred to as an 'RX2'; 311, 331) for receiving a signal, a second receive processing slot (hereinafter, referred to as an 'RXP2'; 312, 332) for processing a received signal, a first receive slot (hereinafter, referred to as an 'RX1'; 313, 333) for receiving a signal, a first receive processing slot (hereinafter, referred to as an 'RXP1'; 314, 334) for processing a received signal, a transmit slot (hereinafter, referred to as a 'TX'; 315, 335) for transmitting a signal, a transmit processing slot (hereinafter, referred to as a 'TXP'; 316, 336) for processing a signal or receiving a signal, a first acknowledge slot (hereinafter, referred to as an 'ACK1'; 317, 337), a first acknowledge processing slot (hereinafter, referred to as an 'ACKP1'; 318, 338), a second acknowledge slot (hereinafter, referred to as an 'ACK2'; 319, 339), and a second acknowledge processing slot (hereinafter, referred to as an 'ACKP2'; 320, 340).

In a synchronized state of the upstream duration, the RX1 slot and the ACK1 slot of an arbitrary node are synchronized with the TX slot of the child node and the TX slot of the parent node, respectively, and the RX2 slot and the ACK2 slot are synchronized with the TX slot of the grandchild node and the TX slot of the grandparent node, respectively. In a synchronized state of the downstream duration, the RX1 slot and the ACK1 slot of an arbitrary node are synchronized with the TX slot of the parent node and the TX slot of the child node, respectively, and the RX2 slot and the ACK2 slot are synchronized with the TX slot of the grandparent node and the TX slot of the grandchild node, respectively.

On the other hand, in the communication network according to the present invention, an idle period I of a node having a depth of K in a network having the entire hopping number of n is determined by Equation 1.

$$I = (\text{depth}+1)*2*(\text{blank duration}) \quad \text{(Equation 1)}$$

First New Node Join (Terminal Join)

Now, a procedure of allowing a new node to join as a terminal node in an existing network in a sensor network according to an embodiment of the present invention is described with reference to FIGS. 4 and 5. For the convenience of description, it is assumed that the network is configured with three nodes. The three nodes are a first node, a second node, and a terminal node, which are linearly connected to each other.

Figure 4:
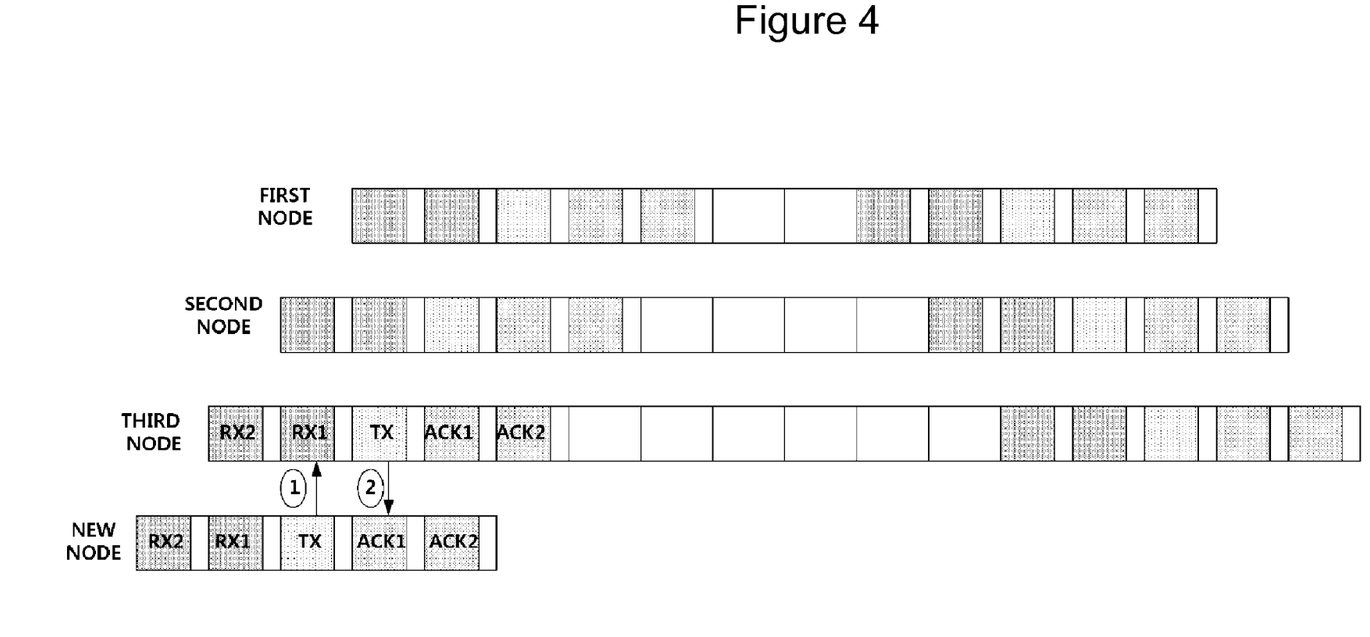
FIGS. 4 and 5 are a conceptual diagram and a flowchart illustrating a process of allowing a new node to join as a terminal node in an existing network in a sensor network according to an embodiment of the present invention.
Figure 5:
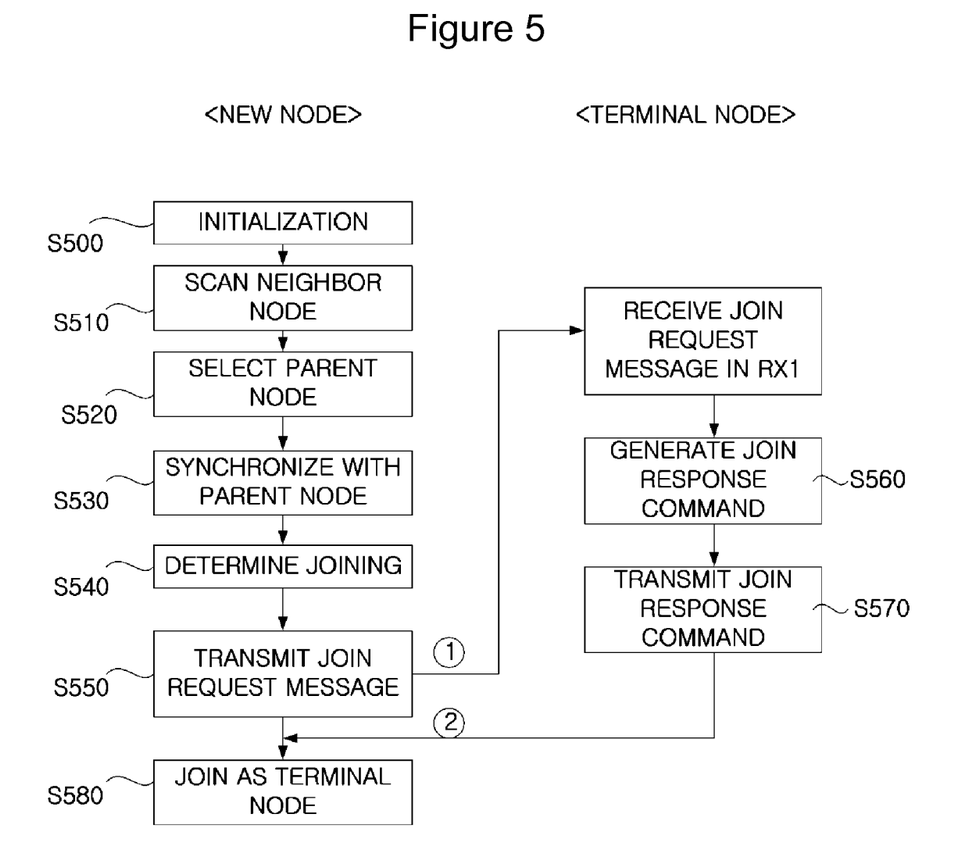

Referring to FIGS. 4 and 5, the new node which is to be joined as a terminal node in the sensor network is initialized (Step S500). After that, neighbor nodes are scanned (Step S510), and a terminal node of the sensor network which is to be a parent node is searched for (Step S520). The new node is synchronized with the terminal node (Step S530). Next, the new node is determined to be joined as the terminal node (Step S540). In the transmit duration TX of the upstream active duration, a join request message is transmitted to the terminal node (Step S550).

On the other hand, in the case where the terminal node receives the join request message from the new node in the first receiving duration RX1 of the upstream active duration (①), the terminal node generates a join response command in the first receive processing duration RXP1 of the upstream active duration (Step S560). The terminal node transmits the join response command to the new node in the transmit duration TX (Step S570).

In the first acknowledge duration ACK1 of the upstream active duration, the new node receives the join response command from the terminal node (②), adjusts the intermission duration, and is changed into the synchronized state, so that the new node becomes a terminal node of the sensor network in the next period (Step S580).

Second New Node Join (Break Join)

Now, a procedure of allowing a new node to join as an intermediate node in an existing network in a sensor network according to an embodiment of the present invention is described with reference to FIGS. 6 and 7. For the convenience of description, it is assumed that the network is configured with three nodes. The three nodes are a first node, a second node, and a third node, which are linearly connected to each other. Hereinafter, the procedure of allowing a new node to join as a second node is described.

Figure 6:
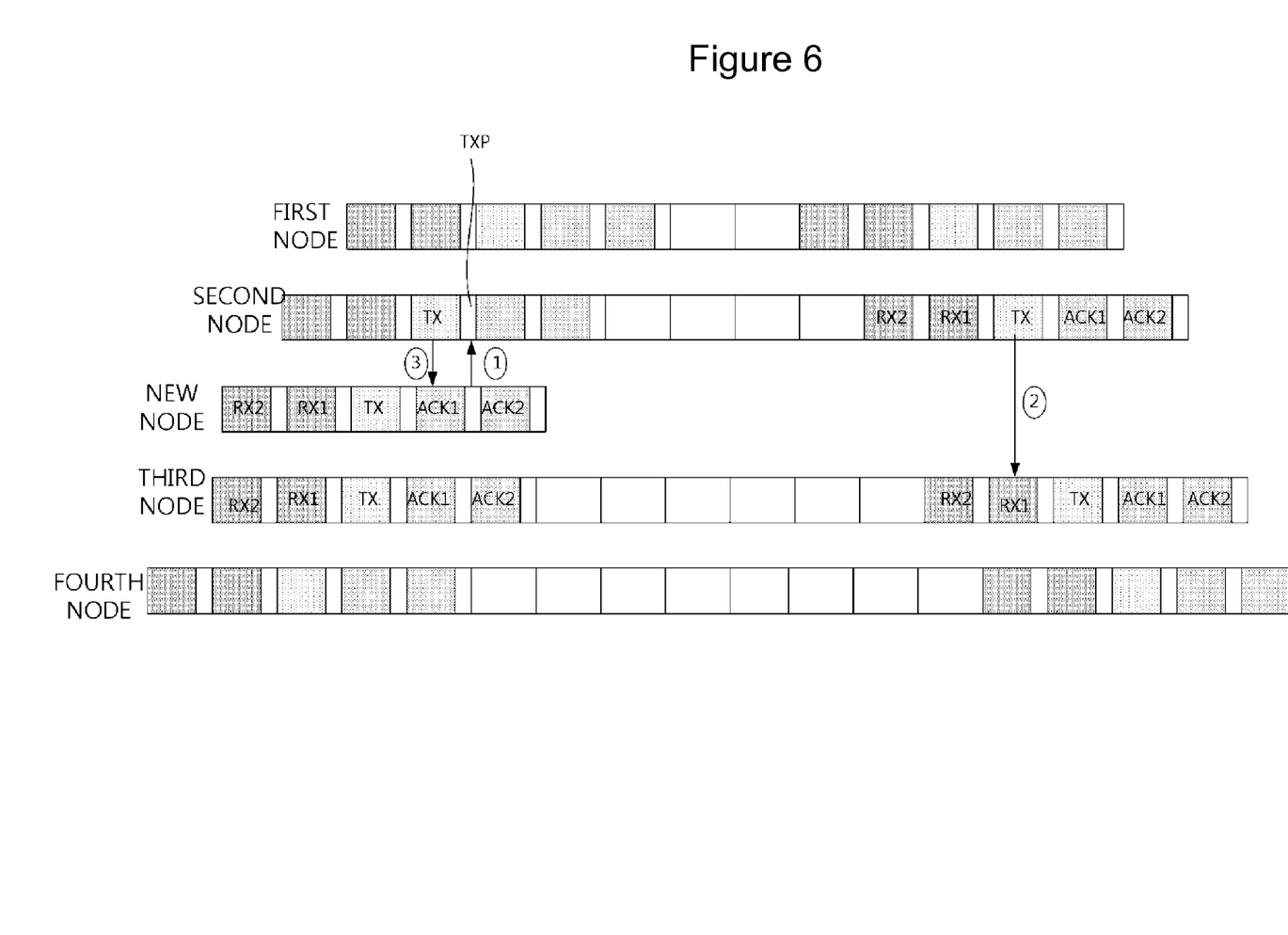
FIGS. 6 and 7 are a conceptual diagram and a flowchart illustrating a process of allowing a new node to join as an intermediate node in an existing network in a sensor network according to an embodiment of the present invention.
Figure 7:
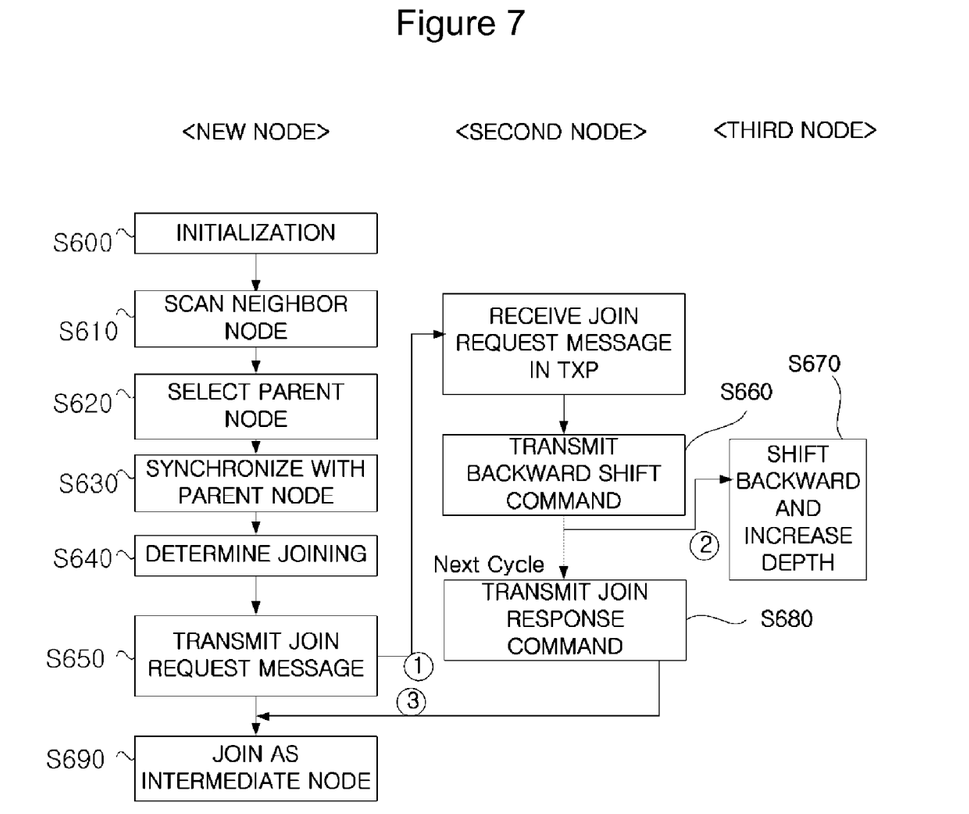

Referring to FIGS. 6 and 7, the new node which is to be joined as an intermediate node of the sensor network is initialized (Step S600). After that, neighbor nodes are scanned (Step S610), and a second node, that is, the intermediate node of the sensor network which is to be a parent node is searched for (Step S620). The new node is synchronized with the second node (Step S630).

Next, the new node is determined to be joined as the second node (Step S640). In the first acknowledge processing duration ACKP1 of the upstream active duration, a join request message is transmitted to the second node (Step S650).

On the other hand, in the case where the second node receives the join request message from the new node in the transmit processing duration TXP of the upstream active duration (①), the second node transmits a backward shift command and a depth adjust command to the third node in the transmit duration TX of the downstream active duration (Step S660).

On the other hand, if the third node receives the backward shift command in the second receiving duration (②), the third node shifts backward by one time slot duration and increases the depth by one (Step S670).

Next, when the cycle arrives, the second node transmits a join response command to the new node in the transmit duration TX of the upstream active duration (Step S680).

In the first acknowledge duration ACK1 of the upstream active duration of the next cycle, the new node receives the join response command from the terminal node (③), adjusts the intermission duration, and is changed into the synchronized state, so that the new node is joined as a child node of the second node and a parent node of the third node in the sensor network (Step S690).

In this manner, in the wireless sensor network according the present invention, the transmit processing duration TXP is maintained as a receiving mode where data can be received from different nodes, so that the new node can be easily jointed as the terminal node or the intermediate node.

First Recovery Process

Now, a link recovery process in the case where a link of one node is disconnected in the sensor network according to the present invention is described with reference to FIGS. 8 and 9. The link recovery process is a process of recovering a disconnected link of an intermediate node in a topology of the whole network. For the convenience of description, it is assumed that the network is configured with three nodes. The three nodes are a first node, a second node, and a third node, and a process of recovering a disconnected link of the second node is described.

Figure 8:
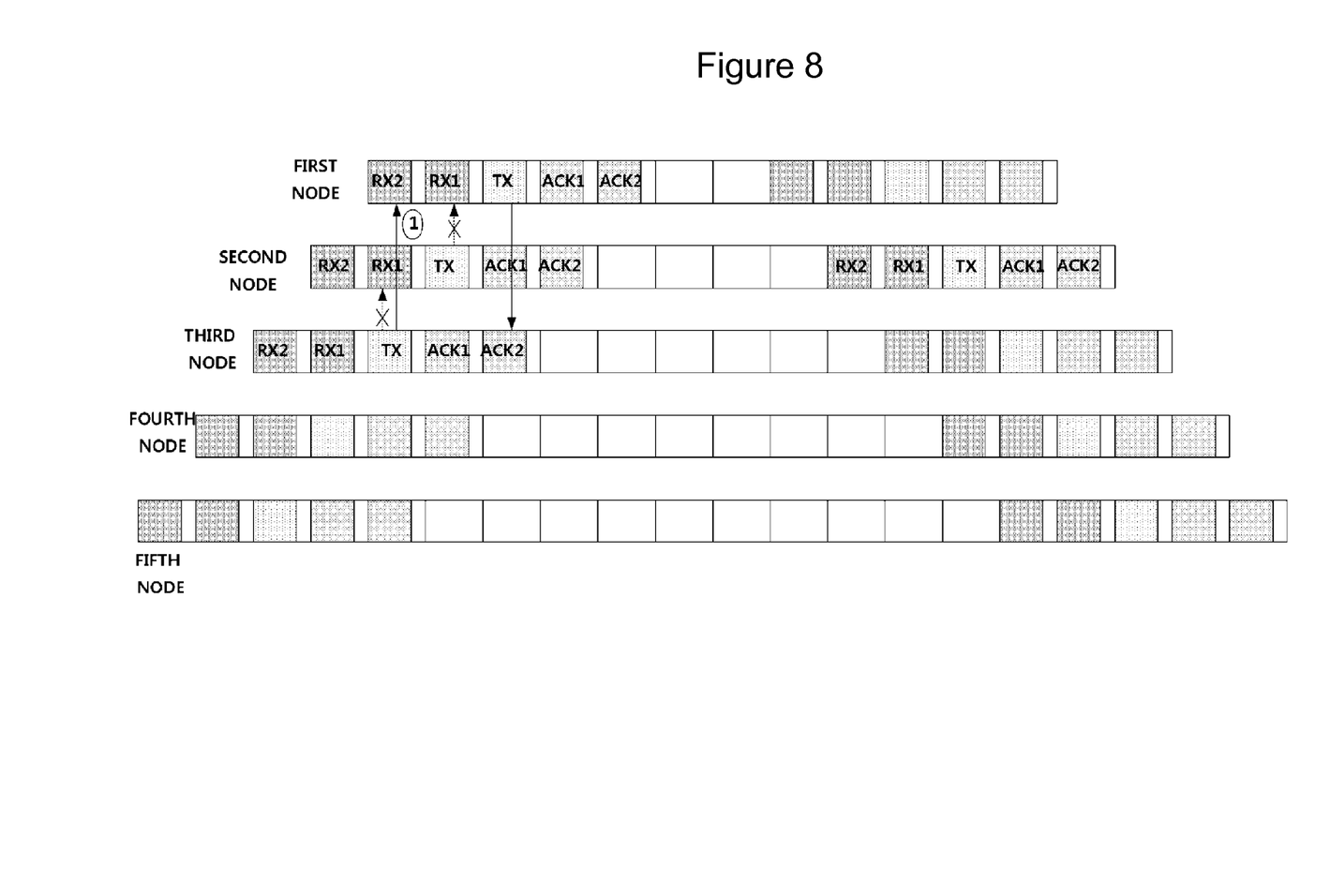
FIGS. 8 and 9 are a conceptual diagram and a flowchart illustrating a process of performing link recovery in the case where a link of one node is broken in a sensor network according to an embodiment of the present invention.
Figure 9:
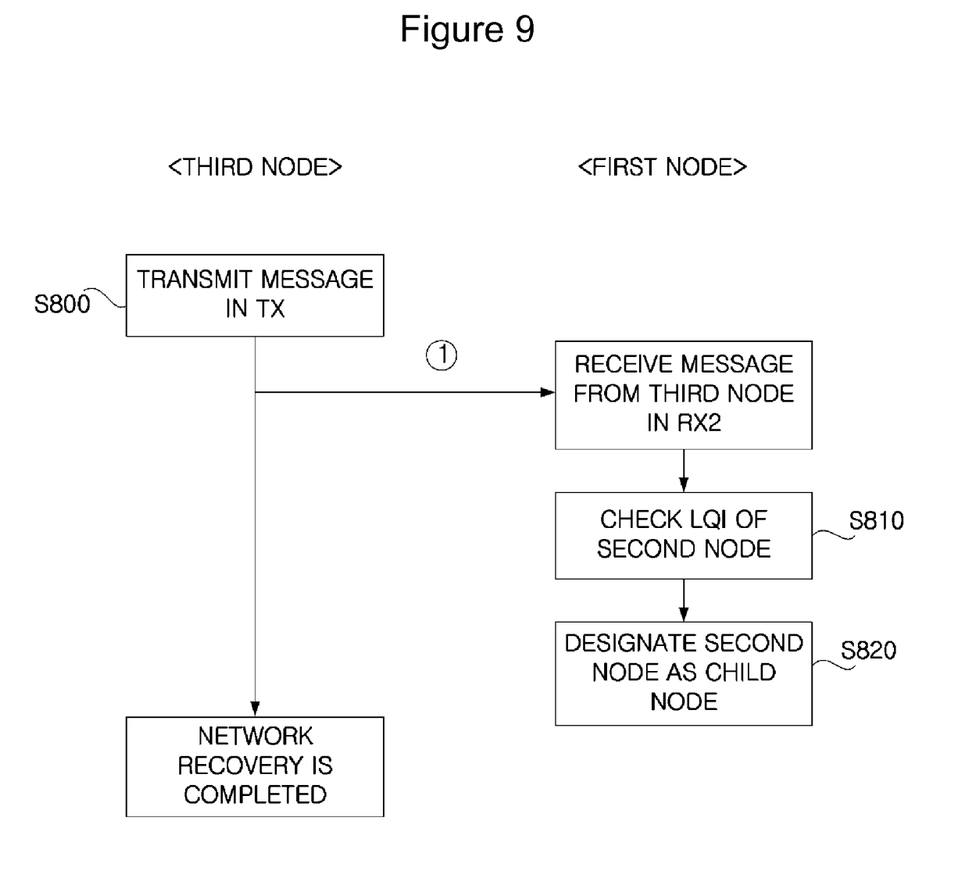

Referring to FIGS. 8 and 9, the third node transmits messages to the second node and the first node in the transmit duration TX of the upstream active duration (Step S800).

On the other hand, if there is no data reception from the second node, that is, a child node in the first receiving duration RX1, the first node checks a link state of the second node (Step S810). If the link of the second node is checked to be disconnected, the first node changes the child node from the second node to the third node (Step S820), and the recovery process is completed.

Therefore, in the sensor network according to the present invention, in the case where a link of one node is disconnected, the recovery process is simply completed only by changing the child node with respect to the parent node without a change in the duration of other nodes.

Herein, the process of checking the link state of the second node is performed by checking an LQI (link quality indicator) of the second node. The LQI is a constant value determined according to whether or not to receive data from the second node. However, in the present invention, the method of checking the link state is not limited to the method using the LQI, but other various methods may be used.

Second Recovery Process

Figure 10:
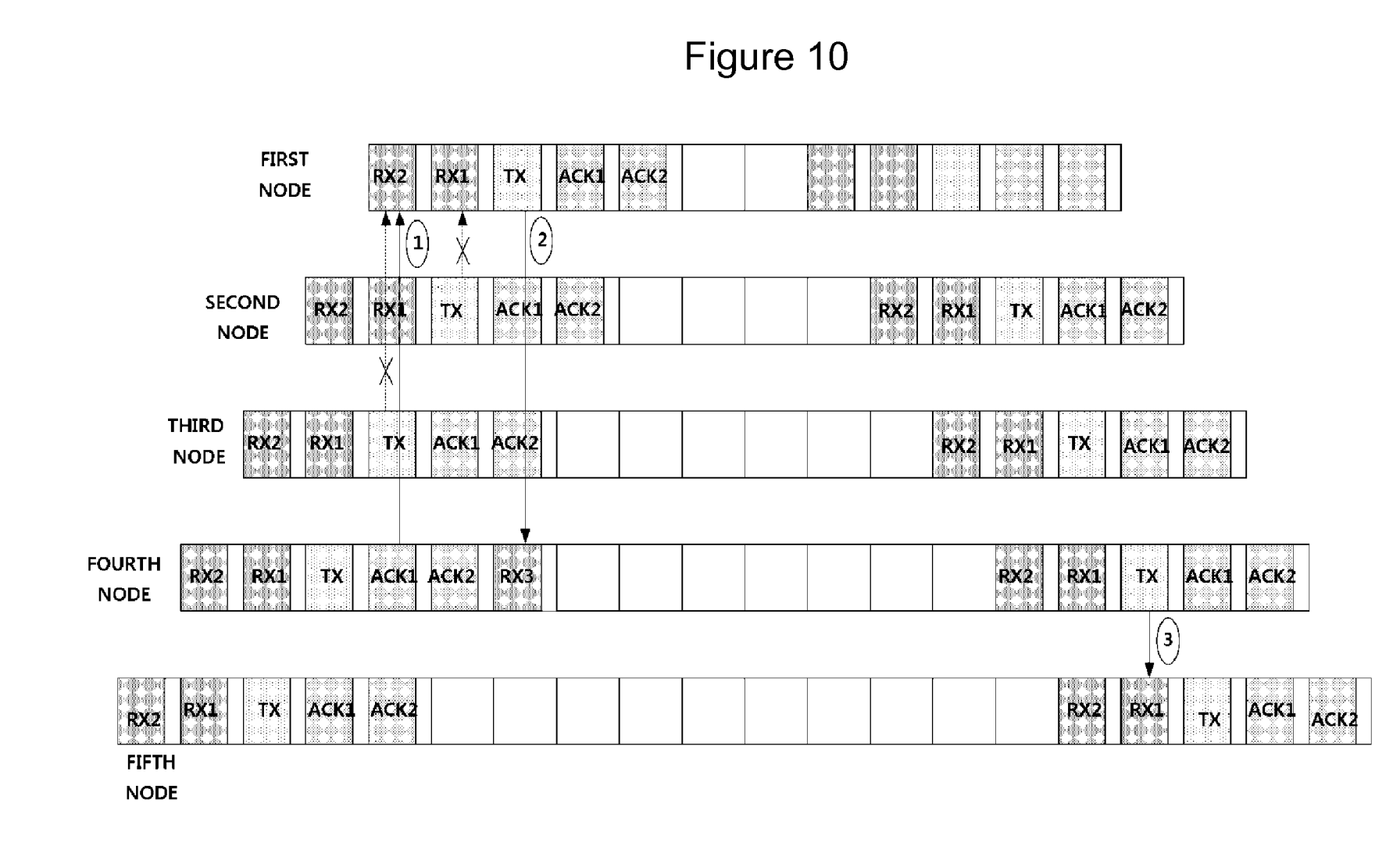
FIGS. 10 and 11 are a conceptual diagram and a flowchart illustrating a process of performing link recovery in the case where a link of two consecutive nodes is broken in a sensor network according to an embodiment of the present invention.
Figure 11:
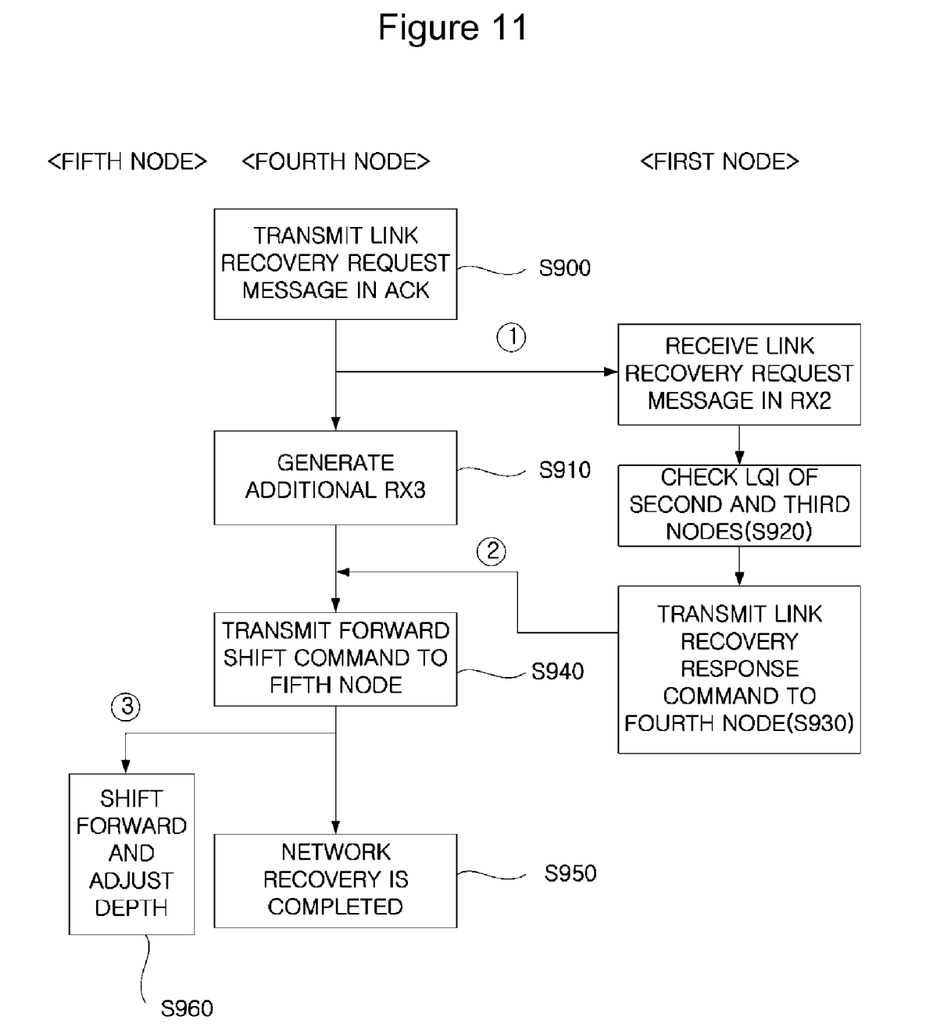

Now, a link recovery process in the case where a link of consecutive two nodes is disconnected in the sensor network according to the present invention is described with reference to FIGS. 10 and 11. The link recovery process is a process of recovering a disconnected link of an intermediate node in a topology of the whole network. For the convenience of description, it is assumed that the network is configured with five nodes. The five nodes are a first node, a second node, a third node, a fourth node, and a fifth node. A recovery process is described in the case where a link of the second node and third node is disconnected.

In the case where the fourth node cannot perform data transmission/reception with respect to the third node (parent node) and the second node (grandparent node), the fourth node transmits a link recovery request message to the first node during the first acknowledge duration ACK1 of the upstream active duration (Step S900) and, after that, generates an additional third receiving duration RX3 following the second acknowledge processing duration ACKP2 (Step S910). The second receiving duration is formed to be synchronized with the transmit duration TX of the first node.

On the other hand, in the case where the first node receives the link recovery request message from the fourth node during the first receiving duration RX2 (①), the first node checks link quality indicators (LQIs) of the second node (child node) and the third node (grandchild node) (Step S920). After that, if both the links of the second node and the third node are checked to be disconnected, the first node transmits a link recovery response command to the fourth node in the upstream active duration (Step S930).

In the case where the fourth node receives the link recovery response command from the first node during the third receiving duration RX3 of the upstream active duration (②), the fourth node transmits a forward shift request command and a depth adjust command to the fifth node during the transmit duration TX of the downstream active duration (Step S940). Next, the fourth node adjusts the depth thereof and shifts forwards by one slot.

In the case where the fifth node receives the forward shift request command and the depth adjust command from the fourth duration during the first receiving duration RX1 (③), the fifth node shifts forwards by one duration and, at the same time, decreases the depth by 1 (S960). Accordingly, although the links of the consecutive second and third nodes are disconnected, the link recovery can be simply obtained.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

A communication method in a sensor network according to the present invention may be widely used in the field of the wireless sensor network (WSN) where a plurality of sensor nodes are distributed or in the ubiquitous field.

The invention claimed is:

1. A wireless sensor network having a plurality of nodes each communicating over a wireless communication link, wherein at least one of the plurality of nodes is connected to a sensor,
   wherein each of the nodes has an active duration so as to transmit and receive data with respect to an upper node and a lower node, wherein the active duration is configured to include an upstream duration for transmitting data and commands from a terminal node to a sink node and a downstream duration for transmitting data and commands from a sink node to a terminal node,
   wherein each of the downstream duration and the upstream duration is configured to sequentially include a second receive slot RX2, a second receive processing slot RXP2, a first receive slot RX1, a first receive processing slot RXP1, a transmit slot TX, a transmit processing slot TXP, a first acknowledge slot ACK1, a first acknowledge processing slot ACKP1, a second acknowledge slot ACK2, and a second acknowledge processing slot ACKP2, and
   wherein bidirectional communication can be performed between the sink node and the terminal node in a single period of the active duration.

2. The wireless sensor network according to claim 1, wherein the active duration further includes an intermission duration, in which data are not transmitted and received with respect to the upper node and the lower node, between the downstream duration and the upstream duration, and wherein the intermission duration of each node is determined according to a depth of the node and the number of hops constituting the wireless sensor network.

3. The wireless sensor network according to claim 1, wherein the RX1, the RX2, the ACK1, the ACK2, and the TXP of each node of the wireless sensor network are maintained in a receiving mode where data can be received from a different node.

4. The wireless sensor network according to claim 1, wherein, in the wireless sensor network, transmission of data and commands are performed in a synchronized state of the downstream duration and the upstream duration,
   wherein, in a synchronized state of an upstream duration with respect to an arbitrary node, the RX1 and the ACK1 of the node are synchronized with the TX of the child node and the TX of the parent node, and the RX2 and the ACK2 of the node are synchronized with the TX of the grandchild node and the TX of the grandparent node, and
   wherein, in a synchronized state of a downstream duration with respect to an arbitrary node, the RX1 and the ACK1 of the node are synchronized with the TX of the parent node and the TX of the child node, and the RX2 and the ACK2 of the node are synchronized with the TX of the grandparent node and the TX of the grandchild node.

5. A method of transmitting and receiving data bidirectionally in a wireless sensor network having a plurality of nodes, wherein an active duration of each node includes an upstream duration for transmitting a signal from a terminal node to a sink node and a downstream duration for transmitting a signal from a sink node to a terminal node, wherein each of the upstream duration and the downstream duration includes a second receive slot RX2, a second receive processing slot RXP2, a first receive slot RX1, a first receive processing slot RXP1, a transmit slot TX, a transmit processing slot TXP, a first acknowledge slot ACK1, a first acknowledge processing slot ACKP1, a second acknowledge slot ACK2, and a second acknowledge processing slot ACKP2, the method including steps of:
   (a1) synchronizing the RX1 and the ACK1 of the upstream duration of a specific node with the TX of the child node and the TX of the parent node and synchronizing the RX2 and the ACK2 with the TX of the grandchild node and the TX of the grandparent node; and
   (a2) synchronizing the RX1 and the ACK1 of the downstream duration of the specific node with the TX of the parent node and the TX of the child node and synchronizing the RX2 and the ACK2 with the TX of the grandparent node and the TX of the grandchild node.

6. The method according to claim 5, further comprising steps of: in the case where an external new node is to join as a terminal node of the wireless sensor network,
   (b1) the new node searching for a terminal node by scanning the nodes of the network;
   (b2) the new node transmitting a join request message to the searched terminal node;
   (b3) the terminal node transmitting a join response command to the new node; and
   (b4) the new node being changed in a synchronized state according to the join response command from the terminal node and the new node becoming a terminal node in the next period, so that the new node is allowed to join as the terminal node of the network.

7. The method according to claim 5, further comprising steps of: in the case where an external new node is to join as an intermediate node of the wireless sensor network,
   (b1) the new node selecting a parent node by scanning the nodes of the network;
   (b2) the new node transmitting a join request message to the selected parent node during the ACKP1 of the upstream duration;
   (b3) in the case where the parent node receives the join request message from the new node during the TXP of the upstream duration, the parent node transmitting a backward shift command to a child node during the TX of the downstream duration;
   (b4) the child node shifting backwards by one time slot duration according to the backward shift command received from the parent node;
   (b5) the parent node transmitting a join response command to the new node during the TX of the upstream duration in the next period; and
   (b6) the new node being changed in a synchronized state according to the join response command from the terminal node and the new node becoming a child node of the parent node, so that the new node is allowed to join as the intermediate node of the network.

8. The method according to claim 5, further comprising steps of: in the case where the link to the second node is disconnected in the sensor network where the first node, which is an upper node, the second node, and the third node are sequentially connected to each other, (c1) the third node transmitting a message to the first node and the second node during the TX of the upstream duration; and (c2) if the link of the second node is checked to be disconnected, the first node changing the third node into a child node of the first node, so that the network is recovered without a process of changing durations of other nodes.

9. The method according to claim 5, further comprising steps of: in the case where the links to the consecutive second and third nodes are disconnected in the sensor network where the first node, which is an upper node, the second node, the third node, the fourth node, and the fifth node are sequentially connected to each other, (d1) if the data transmission and reception with respect to the second and third nodes are checked not to be available, the fourth node transmitting a link recovery request message to the first node and, after that, generating a third receiving duration to be synchronized so as to receive data from the first node;

(d2) if the link recovery request message is received from the fourth node, the first node checking the states of the links to the second and third nodes and, after that, transmitting a link recovery response command to the fourth node;

(d3) if the link recovery response command is received from the first node, the fourth node transmitting a forward shift request command to the fifth node during the third receiving duration; and (d4) the fifth node shifting forwards by one time slot duration according to the forward shift request command from the fourth node, so that the network is received.

10. The method according to claim 9, wherein the third receiving duration of the fourth node is generated to follow the second acknowledge processing duration ACKP2 and synchronized with the transmit duration TX of the first node.

* * * * *